UNITED STATES PATENT OFFICE.

NILS BUSVOLD, OF RJUKAN, NORWAY.

PRODUCTION OF OXYGEN COMPOUNDS OF NITROGEN FROM AMMONIA.

1,222,928.      Specification of Letters Patent.      Patented Apr. 17, 1917.

No Drawing.      Application filed December 16, 1915. Serial No. 67,279.

*To all whom it may concern:*

Be it known that I, NILS BUSVOLD, a subject of the King of Norway, residing at Rjukan, Norway, have invented certain new and useful Improvements in the Production of Oxygen Compounds of Nitrogen from Ammonia; and I do hereby declare the following to be a full, clear, and exact description of the invention, such as will enable others skilled in the art to which it appertains to make and use the same.

This invention relates to the production of oxygen compounds of nitrogen from ammonia by means of oxidation in the presence of a catalyst and has for its object a process by means of which the output of such oxidation is considerably increased.

In processes for the oxidation of ammonia by means of air or other gases containing oxygen in the presence of catalysts so as to produce nitrogen oxygen compounds losses will take place for the reason that part of the ammonia is not oxidized further than to produce free nitrogen.

It is known that such losses are reduced by carrying out the process in such manner that the gas mixture remains in contact with the catalyst for a very short time only. Even when working in this manner it has not been possible however to attain a quantitative oxidation of the ammonia into nitrogen oxygen compounds at least not when the process is carried out on an industrial scale.

To further increase the output it has been proposed to effect the oxidation under an increased pressure and it has been considered as being of special importance that the gas mixture on leaving the catalyst is still under a considerable pressure (such a process being described for instance in the Norwegian patent specification No. 26037 to Verein Chemischer Fabriken in Mannheim).

By means of experiments the applicant has now ascertained that in contradiction to the principle of this known process a considerable improvement of the output is obtained when the oxidized gas mixture is caused to leave the catalyst at a lower pressure than that of the atmosphere. The present invention is now based upon this observation and accordingly consists in working under such conditions that the gas leaving the catalyst is maintained under a pressure lower than that of the atmosphere. In prior experiments to effect an oxidation or combustion of ammonia a great difference between the pressure in front of the catalyst and in the gas leaving the catalyst has in several cases been made use of so that a large fall of pressure takes place. The applicant has found however, that when the pressure in the gases leaving the catalyst is lower than that of the atmosphere it is not necessary to work with such large falls of pressure.

According to the present invention when the gas leaving the catalyst is maintained at a pressure below that of the atmosphere, a fall of pressure of less than 50 mm. (mercurial column) will in most cases be sufficient to obtain a practically quantitative combustion that is an output of about 98–100 per cent.

In the preceding description the expression "catalyst" is meant to cover materials which consist throughout of a catalytically active substance as well as such materials in which the catalytic agent proper is carried on an inactive support and the like.

I claim:

1. In the oxidation of ammonia in the presence of a catalyst the process which consists in passing a gas mixture containing ammonia and oxygen through a layer of a catalytic agent, in such a manner that the pressure in the gas leaving the catalyst is lower than that of the atmosphere.

2. In the oxidation of ammonia in the presence of a catalyst the process which consists in passing a gas mixture containing ammonia and oxygen through a layer of a catalytic agent, in such a manner that the pressure in the gas leaving the catalyst is lower than that of the atmosphere the fall of pressure in the catalyst being at the same time less than 50 mm. mercurial column.

In testimony that I claim the foregoing as my invention, I have signed my name in presence of two subscribing witnesses.

NILS BUSVOLD.

Witnesses:
  M. E. GUBBORMAN,
  C. FABRICIUS HANSEN.